W. H. SHIMPF.
INTERNAL COMBUSTION ENGINE.
APPLICATION FILED NOV. 19, 1910.

1,196,598.

Patented Aug. 29, 1916.
9 SHEETS—SHEET 3.

Fig. 3.

WITNESSES:

INVENTOR
Walter H. Shimpf.
BY
ATTORNEY.

W. H. SHIMPF.
INTERNAL COMBUSTION ENGINE.
APPLICATION FILED NOV. 19, 1910.

1,196,598.

Patented Aug. 29, 1916.
9 SHEETS—SHEET 6

WITNESSES:
J. Clyde Ripley
Kate Brenner

INVENTOR
Walter H. Shimpf.
BY
W. H. Becker
ATTORNEY

UNITED STATES PATENT OFFICE.

WALTER H. SHIMPF, OF NEW YORK, N. Y.

INTERNAL-COMBUSTION ENGINE.

1,196,598.   Specification of Letters Patent.   Patented Aug. 29, 1916.

Application filed November 19, 1910. Serial No. 593,143.

*To all whom it may concern:*

Be it known that I, WALTER H. SHIMPF, a citizen of the United States, and a resident of New York, in the county of New York and State of New York, have invented certain new and useful Improvements in Internal-Combustion Engines, of which the following is a full, clear, and exact description, whereby any one skilled in the art may make and use the same.

The invention relates to internal combustion engines and more particularly to a new form of engine, which will utilize an explosive mixture, in such manner and under such control, that the working piston and cylinder and appurtenant parts will not be subjected to an accumulation of the products of combustion, such as would interfere with the operation of the working parts.

To indicate the objects and advantages of the invention hereinafter defined, reference is herein made to the well-known types of internal combustion engines known in the art.

There is a four-cycle or Otto-cycle engine in which there is a suction, a compression, a working, and an exhaust stroke of the working piston during the two complete revolutions of the crank shaft. The inlet and exhaust valves operate in conjunction with the working piston and are either of a mechanically-operated or puppet-type or a combination of both which have certain inherent inaccuracies of action, with the incidental complications, as to opening and closing of the valves to secure proper admission, compression and exhaust of the gases. Necessarily a fly-wheel effect is relied upon to steady the operation of the piston and carry the crank-shaft over its dead center point during the cycle of operation intermediate the working strokes. There is also the two-cycle type of engine which utilizes an admission, compression, working and exhaust stroke of the main piston during one complete revolution of the main crank shaft. In this type, the admission, compression and exhaust are effected in various manners, either by utilizing moving valves or by utilizing the main working piston in conjunction with cylinder-ports and in further conjunction with a crank case, compression chamber or a supplemental compression piston acting directly with the main working piston. In such types of two-cycle engines, there has been difficulty in preventing premature ignition of the charges of explosive mixture upon the wrong side of the piston as, owing to variable compressions with differently attenuated explosive mixtures, premature firing occurs prior to the proper positioning of the valves, permitting a firing of the charge back to the crank case or auxiliary compression cylinder. It is also true that, in the four-cycle engine, utilizing high compressions to secure the most powerful working strokes upon the piston or pistons, that premature ignition results, due in part, to the accumulated heat of the apparatus which fires the charge before the piston has reached the proper position to secure the most advantageous driving impulse of the ignited gases. In the four-cycle type properly constructed, such premature ignition is not particularly dangerous, but acts to retard the action of the piston and materially reduces the efficiency of the engine. In the two-cycle type such premature explosions become almost dangerous and at any rate are sufficient to blow past valves, stuffing-boxes, bearings, and journals, practically destroying the efficiency of the engine.

Obviously, there is a great advantage in having an impulse upon the working piston at each revolution of the crank-shaft, (as in the ordinary two-cycle engine) in contradistinction to an impulse in each two revolutions, (as in the case of the four-cycle engine) provided, the disadvantages above referred to are eliminated. This may be accomplished, as hereinafter defined, by having certain valve action wherein the full force and effect of the ignited and burning charge of any suitable explosive mixture is introduced to the working cylinder, ignited and fired, without premature firing and with assurances that its full force will be directed toward impelling said piston at the proper point of its working stroke.

The objects of the present invention are therefore, to provide for the absolute control of the action of an ignited charge of explosive mixture with reference to the working piston or pistons of an engine, overcoming and even utilizing the effects of premature ignitions and providing an impulse upon the piston or pistons at each revolution of the crank shaft.

A further object is to provide positively actuated and controlled means, whereby a charge of explosive mixture is compressed; introduced to the working cylinder; fired, under control, obviating disastrous premature ignition, and the products of combustion completely exhausted, upon each revolution of the crank shaft.

A still further object, is to provide for the induction and compression of a charge of explosive mixture during the movement of the working piston, in conjunction with a positively acting transfer and valve mechanism, so correlated that the efficiency of the working stroke is maintained and a complete scavenging of the parts is effected.

Finally, it is apparent, that the general object of the invention is to provide a mechanism which will combine the most efficient principles of both the four-cycle and two-cycle type of engine which, in conjunction with one or more cylinders and their pistons, will give determinate induction, compression and firing of the charge of mixture with a complete eduction and scavenging of the spent gases, without liability of disastrous and uncertain firing of the charge.

Referring to the drawings.

In the accompanying drawings, the numeral 1, denotes the crank case of an engine having a crank shaft 2, supported in suitable bearings and provided with a fly-wheel 3. The crank case supports the various cylinders herein shown as four in number and indicated as 4, 5, 6, and 7.

Operatively arranged with reference to the crank shaft and connected thereto for positive movement by gears 8, 9, is a camshaft 10, which controls the movement and position of transfer pistons 10ª, and auxiliary valves 11, arranged adjacent to each cylinder of the engine. The cylinders, transfer piston chambers and valve chambers are suitably jacketed so that a water cooling system may be employed to maintain normal operating temperatures about all of the various parts.

The numeral 12, indicates a timing device which may be of any desired character and the numeral 13, represents an ignition plug although, of course, any desired type of ignition, as well as timing device might be utilized with the mechanism hereinafter described.

As the various cylinders and appurtenant parts are identical, the cylinder 4, with its transfer piston and auxiliary valve is described in detail.

The piston 14, of the cylinder 4, has a working head 15, and a compression head 16, shown herein as integrally formed; the head 16, as well as the head 15, being provided with suitable piston rings for forming a tight-fit within the cylinder 4, and the adjacent cylinder 17, which may be termed the compression cylinder. There is an induction and eduction passage 18, connecting the compression cylinder 17, with a transfer chamber 19, and the port 20, of said transfer chamber is controlled by a piston valve 21, which, in conjunction with a piston valve 22, provides a means for controlling the inlet and exhaust port 23, of the working piston 14, and provides for admitting a mixture to the compression cylinder 17, and transfers the compressed charges of said compression cylinder to the working piston 14.

The numeral 24, indicates the inlet for the explosive mixture which, when the piston valve 21, is above the port 20, may be drawn into the compression cylinder. This induction to the compression cylinder occurs upon the working stroke of the main working piston 14.

The numeral 25, denotes the main exhaust manifold which, through its connection with the exhaust port 23, permits the main working piston to exhaust its charge of spent gases.

Obviously, any desired form of carbureting mechanism may be utilized in connection with the main inlet 24, where oils and like substances are utilized to form an explosive mixture.

The piston valves 21, 22, are suitably connected by a stem 26, to provide, in conjunction with the walls of the cylindrical chamber 19, a moving transfer member. The compressed gases of the compression cylinder 17, are forced into the chamber thus formed and upon movement of the piston valves 21, 22, this compressed charge of gas may be bodily moved and admitted to the working cylinder 4, over the piston head 15, through the passage 23. A valve stem 27, connected with the valves 21, 22, and working in suitable bearings, is controlled by a lever 28, shown as pivoted at 29, and with arms 30, 31, bearing suitable cam rolls 32, 33, which follow cam-surfaces 34, 35, of a cam 36, suitably mounted upon the camshaft 10, so that the arrangement of the arms 30, 31, and appurtenant parts is such that a definite and positive movement is always given to the lever 28, throughout its entire cycle of movement. No springs are required and no lost motion results in this arrangement. Therefore, the valves 21, 22, are always positively actuated and positioned by the cam-shaft and its lever.

Figures 8, 9:
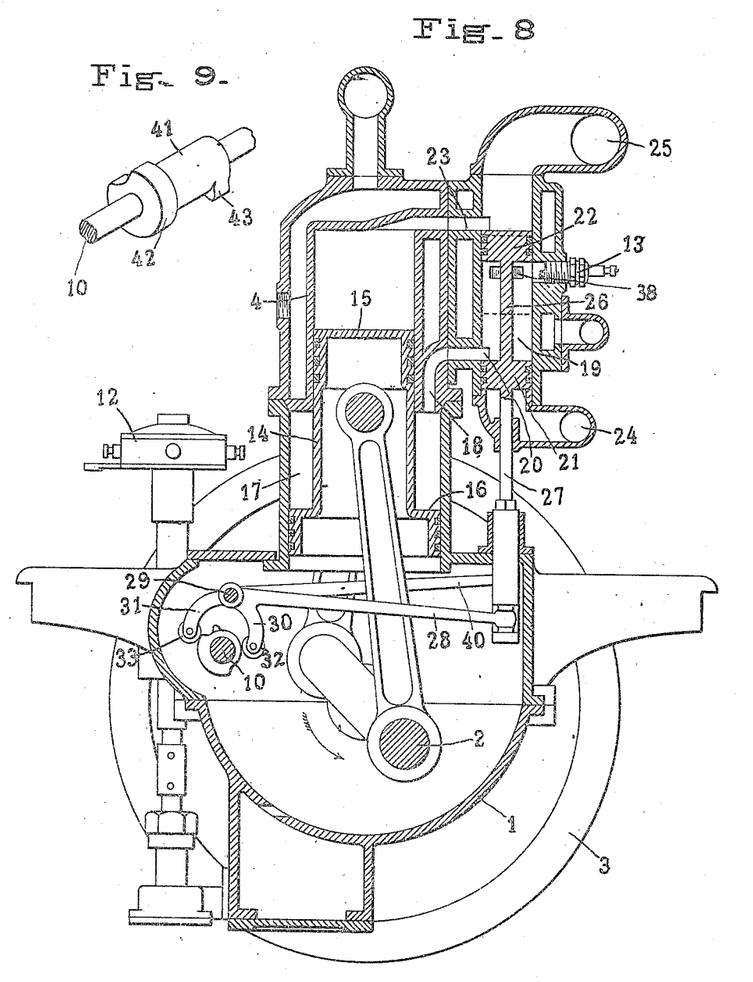
Fig. 8 is a similar sectional view illustrating the working piston upon the beginning of the exhaust stroke, with the transfer piston receiving its charge under compression and the auxiliary valve covering the primary exhaust port.
Fig. 9 is a perspective view of the cam controlling the auxiliary valve.

Adjacent to the transfer chamber 19, is an auxiliary valve chamber 37, within which reciprocates an auxiliary piston valve 11. The chambers 19, and 37, are connected by a port 38, which may properly be called the primary exhaust port and this port is controlled by the auxiliary piston valve 11. The upper end of the chamber 37, above the piston valve is open to the atmosphere or to the main manifold of the exhaust system of the main pistons. The auxiliary piston valve 11, is provided with a stem 39, which is actuated by a lever 40, having a similar arrangement of cam-control to that described in connection with the transfer piston lever 28. Its cam 41, is illustrated in Fig. 9 as having two cam-faces 42, 43, upon which its respective rolls follow and as in the case of the lever 28, this lever 40, is positively moved and controlled in all of its movements.

The main purpose and function of the auxiliary piston valve 11, is to control the primary exhaust port 38, so that the spent gases in the transfer chamber 19, may be fully exhausted preparatory to receiving a new charge of compressed gas, thus obviating the fouling of the transfer cylinder, and providing against the possibility of premature explosions in said transfer cylinder when a fresh charge of gas is compressed therein. This exhaust operation does not in any way interfere with the exhausting of spent gases from the main working cylinder. It is obvious that by the arrangement of parts described that the main working piston may have a full working stroke and that no lost space is required between the working piston and its cylinder head, inasmuch as the gases are ignited in the transfer chamber and while burning are transferred to the working cylinder through the port 23. It also follows that the spent gases in the working cylinder may be entirely and completely exhausted as the piston may have the full working stroke up to the head of the cylinder with just sufficient room for clearance.

The operation of the various parts, while simple in practice, can only readily be understood by reference to the various drawings and diagrams included in Figs. 3 to 15, as the timing and positioning of the various moving elements is all important to the thorough understanding of the device.

Figures 10, 11:
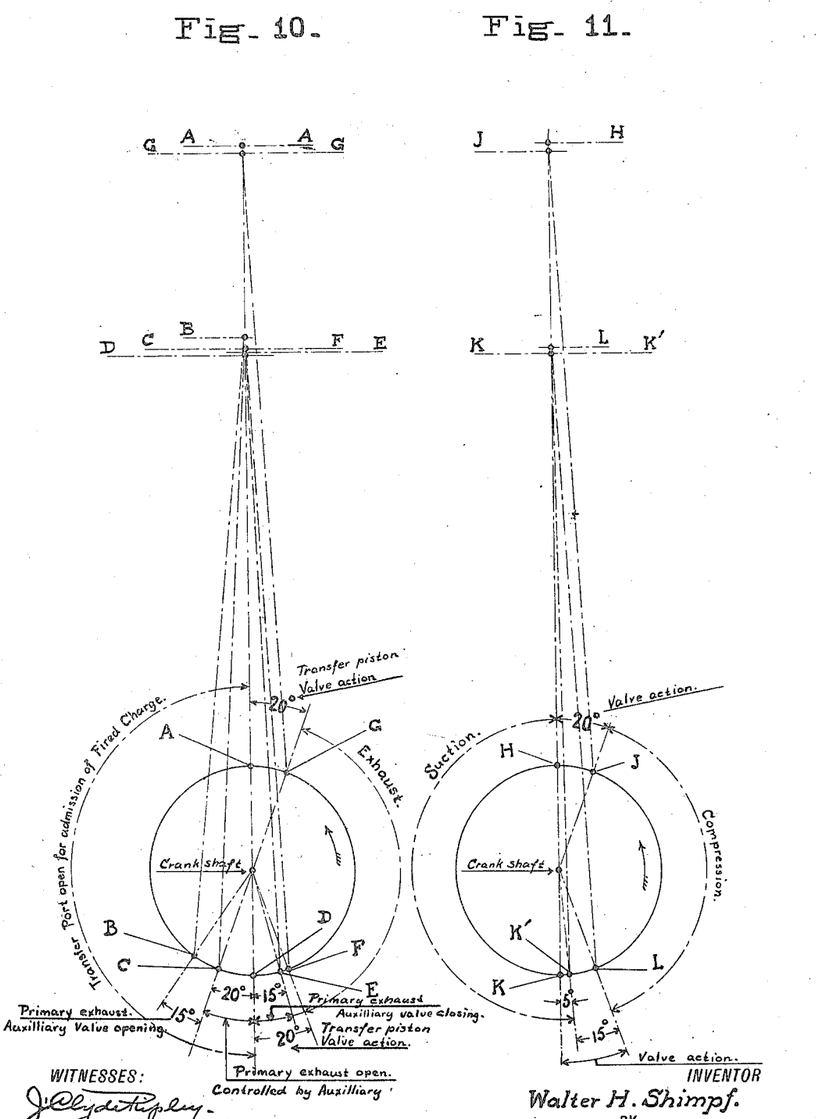
Fig. 10 is a diagrammatic view illustrating the various positions of the working piston during one complete revolution of the crank shaft and its transfer piston and auxiliary valve action.
Fig. 11 is a similar diagrammatic view illustrating the position of the compression piston in conjunction with the transfer piston.
Figure 12:
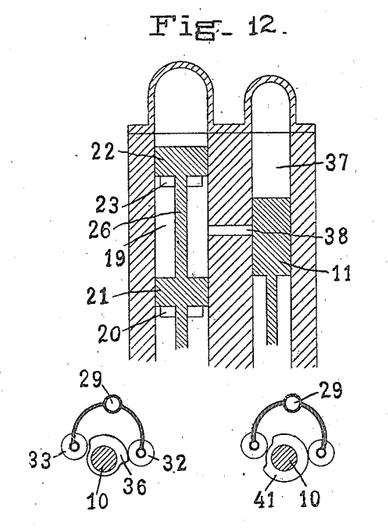
Fig. 12 is a diagrammatic view of the transfer piston, the auxiliary valve and the corresponding cams for respectively operating the same, showing the parts in the positions illustrated in the diagrammatic view of Figs. 10 and 11, with the transfer movement from A to D and the auxiliary valve movement from E to B corresponding to Figs. 4 and 5.

In Fig. 10 there is illustrated diagrammatically the action of the working piston 14, in conjunction with the relatively timed operation of the valves 21, 22, and the auxiliary piston valve 11. In Fig. 11 there is illustrated in similar diagrammatic form the movements of the compression piston 16, which, of course, moves simultaneously with the main working piston. It illustrates the suction or induction and the compression and eduction stroke, timed with reference to the movement of the crank shaft and main working piston and also shows the valve action and its relative timing during a complete cycle of movement of the crank shaft.

In Figs. 12 to 15 the control of the transfer chamber 19, is diagrammatically illustrated by showing the various positions of the valves 21, 22, with reference to the ports 20, 23, and the corresponding positions of the auxiliary valve 11, with reference to the so-called primary exhaust-port 38. To more clearly illustrate the action of these ports and their timed relation with reference to the movements of the main working piston 14, and compression piston 16, the respective cam positions for the cams 36, and 41, which respectively control the levers 28, and 40, connecting with the spindles 27, and 39, are illustrated.

Figure 1:
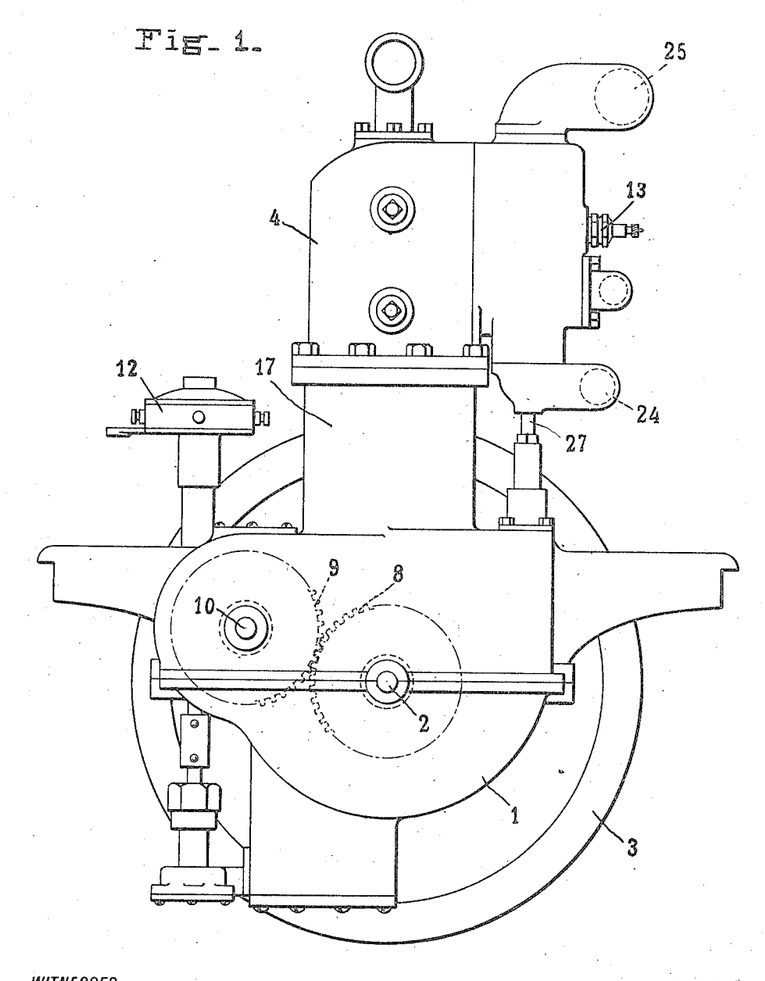
Figure 1 is a front end elevation of the engine embodying the improvements.
Figure 2:
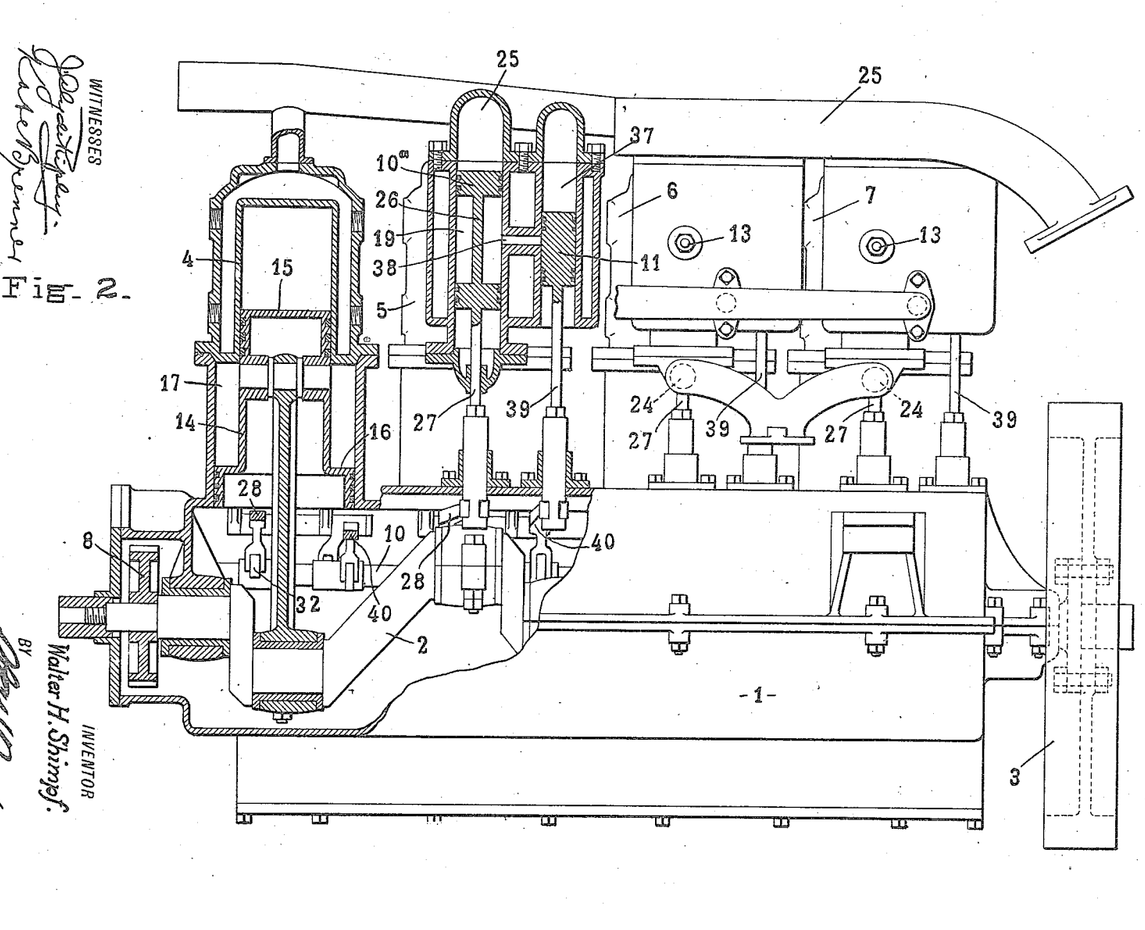
Fig. 2 is a view in side elevation with one of the main cylinders cut in central vertical section and with the adjacent valve chamber and transfer cylinder cut in central vertical section.
Figure 3:
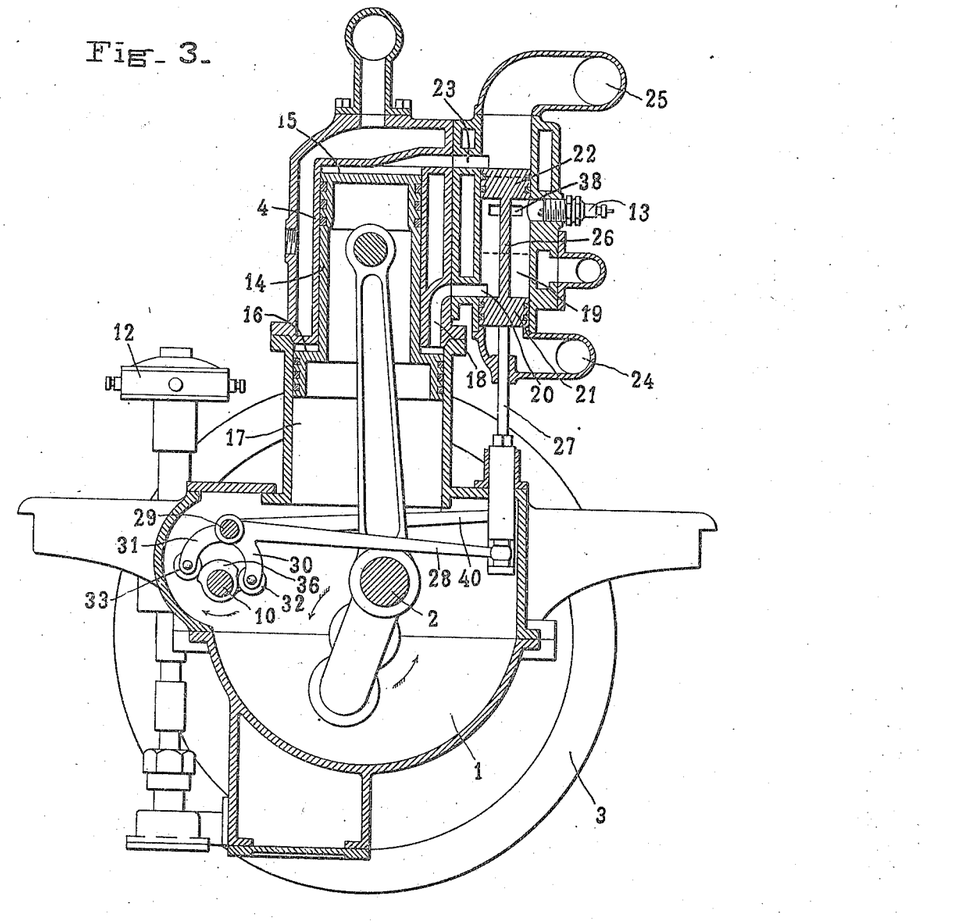
Fig. 3 is a transverse sectional view through one of the working cylinders and appurtenant parts illustrating the working piston completing the exhaust, just prior to the upper dead center movement of the crank shaft and with the transfer piston in position to make its initial movement.
Figure 4:
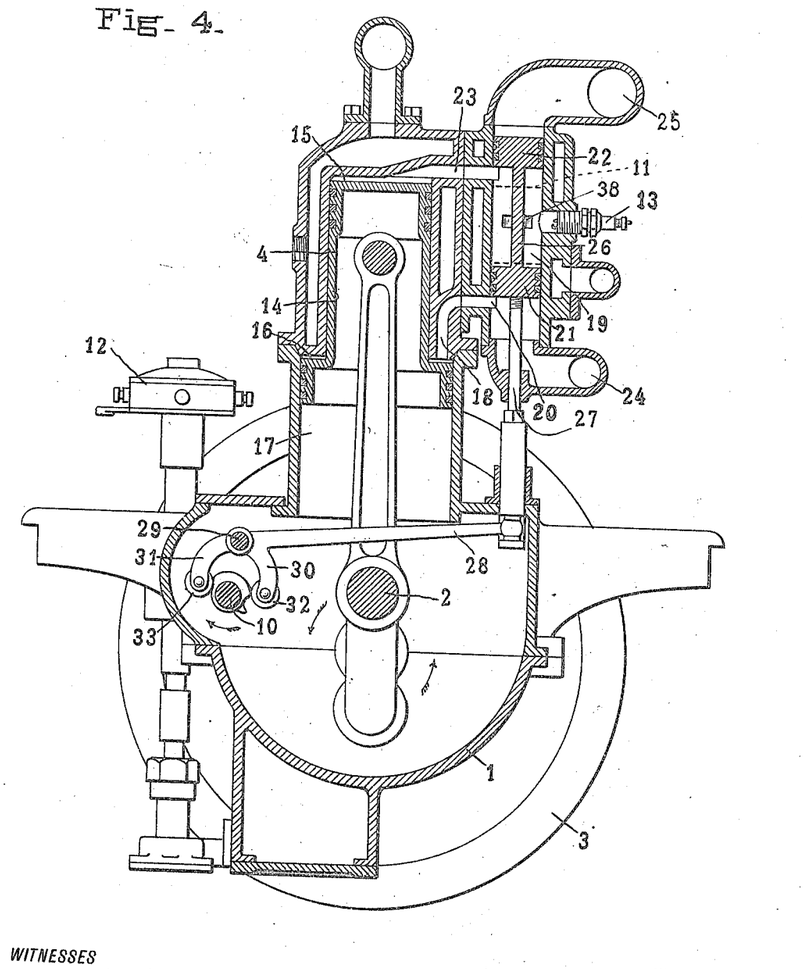
Fig. 4 is a similar sectional view illustrating the working piston at the upper dead center point of the crank shaft with the transfer piston moved to admit its charge of compressed and ignited gases.
Figure 5:
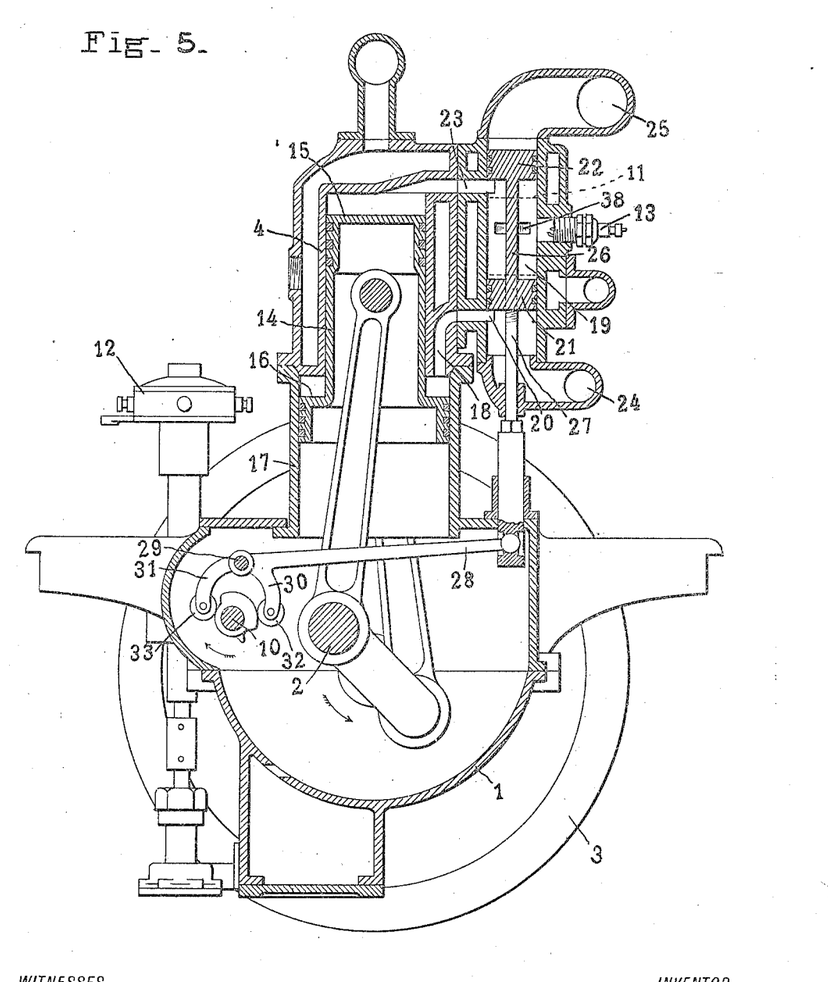
Fig. 5 is a similar sectional view illustrating the position of the working piston and valve parts during the working and suction stroke.
Figures 6, 7:
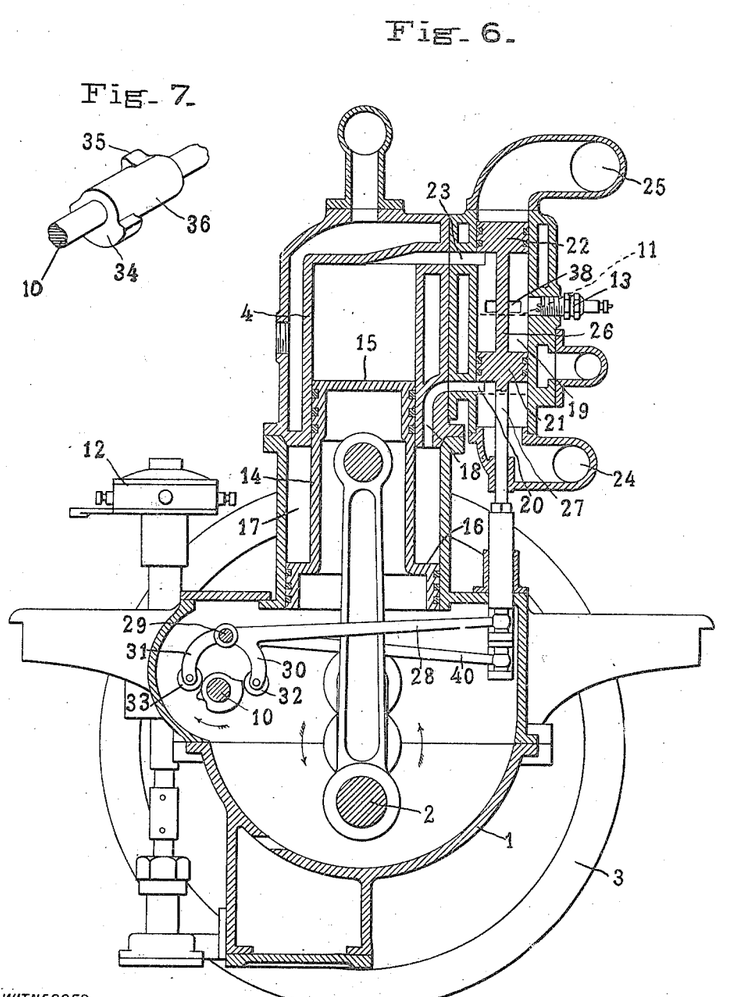
Fig. 6 is a similar sectional view illustrating the working piston at the lower dead center of the crank shaft with the compression piston on its full suction stroke and the auxiliary valve open for the primary exhaust.
Fig. 7 is a perspective view of the cam controlling the transfer piston.
Figure 13:
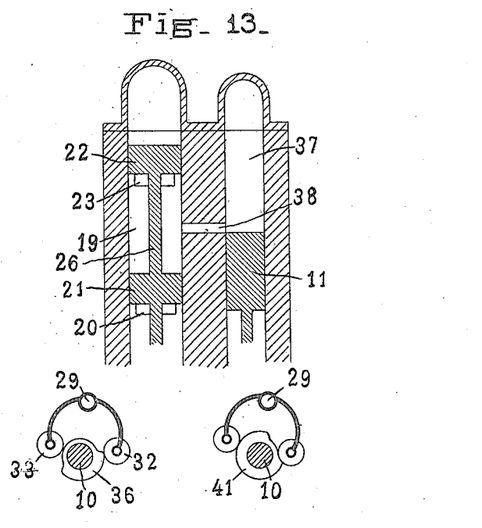
Fig. 13 is a similar view illustrating the transfer piston in the corresponding position illustrated in diagram in Fig. 10 from A to D and the auxiliary valve movement in said diagram from C to D corresponding to Fig. 6.
Figure 14:
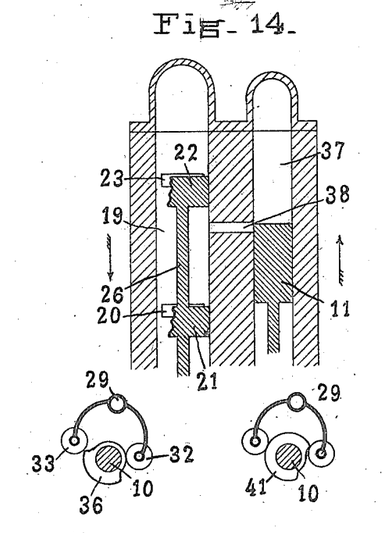
Fig. 14 is a similar view illustrating the ports according to the diagram of Fig. 10 with the movement of the transfer piston from D to F, and the auxiliary valve from D to E corresponding to Figs. 6 and 8.
Figure 15:
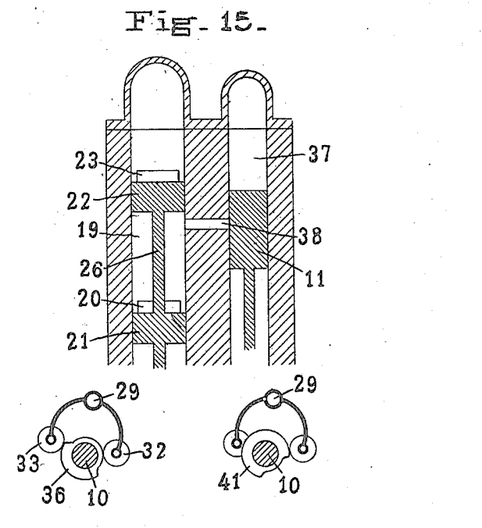
Fig. 15 is a similar view illustrating the transfer piston position F to G as illustrated in Figs. 10 and 8 with the auxiliary valve closed from E to B as illustrated in said figures, which position is maintained during movement of the other parts as illustrated in Figs. 3, 4, 5 and 8.

Referring to the diagrams, Figs. 10 and 11, and the diagrams 12 to 15 inclusive, in conjunction with the sectional views 3 to 8 inclusive, the following cycle of operations occurs. In Fig. 3, the working piston is illustrated as about to complete the exhaust stroke, the valves 22, and 21, being in such position that the compressed charge from the compression cylinder 17, may be forced into the transfer chamber 19, while the exhaust port 23, is open to permit final exhaust of the spent gases in the working cylinder. The auxiliary valve 11, covers the primary exhaust port 38, and the parts are in position to transfer a charge of compressed mixture from the transfer chamber 19, to the main working cylinder. Referring to the diagram Fig. 10, the main working piston is about to move from G to A to effect this final exhaust. The entire exhaust stroke of the working piston is indicated as from F to A. During the movement of the working piston from G to A, the valves 21, 22, move and the compressed charge of the transfer chamber 19 is ignited, transferred and exerts its pressure upon the working piston. The position of the valves 21, 22, of the transfer chamber and the corresponding position of the working piston and auxiliary valve 11, are illustrated in Fig. 4 and diagrammatic view 12. Upon admission of the fired charge to the working cylinder, the piston 14, begins to move as illustrated in Fig. 5 and a new charge of mixture is drawn into the compression cylinder 17, through the inlet 24, port 20, and passage 18, while the working piston moves through the distance indicated from A to D in Fig. 10. During this movement from A to D of the main working piston and compression piston, the auxiliary valve 11, begins to move as indicated between the points B and C and finally fully opens as indicated between C and D, so that the primary exhaust is fully opened as illustrated in Fig. 13, when the working piston has reached its lower dead center point. At the same time, the valves 21, 22, occupy the same position as in Fig. 12 and Fig. 6. A further movement of the working piston from D to F (Fig. 10) effects an initial closing movement of the auxiliary valve 11, tending to cut off the primary exhaust through the port 38, and a movement of the valves 21, 22, as illustrated in Fig. 14 and Figs. 6 and 8. A further movement of the main piston and the crank shaft indicated as from F to G, gives a full exhaust from the working piston as illustrated in Fig. 15, the valves 21, 22, occupying a position as indicated in Fig. 8 and the auxiliary valve of the primary exhaust port 38, maintaining a position corresponding to the movement from E to B. The movement from G to A completes the cycle.

From the above it is apparent that there is a working and simultaneous induction stroke of the working piston and the compression piston, and a compression stroke of the compression piston and a corresponding exhaust stroke of the working piston, which exhaust stroke primarily exhausts through the primary exhaust port 38, to thoroughly scavenge the transfer chamber and then by a quick movement of the valves 21, 22, exhausts directly through the port 23, at the same time permitting ingress of the compressed charge to the transfer chamber 19. Of course, the auxiliary valve 11, has made its movement to cover the primary exhaust port 38, immediately after the primary exhaust.

The timing of the firing of the charge may be accomplished in any desired manner and through any desired means, but it is preferred that the igniter fire the charge in the transfer chamber just prior to the opening movement of the valve 22, with reference to the port 23, and after the closing of the port 20. The operation is so timed that it is obvious there can be no back-firing into the compression chamber and therefore the working piston receives the full effect of the compressed charge which is ignited and exerts its influence solely upon said working piston.

In Fig. 11, the cycle of movement of the compression cylinder is illustrated in diagram in conjunction with the timing of the valve 21, said diagram in conjunction with Fig. 10, giving the full cycle of operation of the working piston, transfer valves, compression piston and auxiliary valve.

Obviously, the details of construction might be varied to a considerable extent, without in any way limiting or varying the purpose and intent of the invention, and various arrangements of levers and cams might be employed without departing from the spirit or intent of the invention, which, in the main, contemplates a cycle of operations, with reference to a working piston such as illustrated and described in detail and by diagrams, wherein the working piston is subjected only to the action of an explosive charge, with the ignition controlled with reference thereto, and wherein the compression is effected extraneously to the main working cylinder and the compressed charge transferred, giving an impulse to the piston at each revolution of the crank shaft, obviating the liability of premature firing and providing a complete scavenging of the working parts.

What I claim as my invention and desire to secure by Letters Patent is:—

1. An internal combustion engine comprising working and compression cylinders, a main working piston, a simultaneously actuated compression piston, a valve controlled transfer chamber having ports operatively arranged with reference to the respective pistons, an inlet and an exhaust, operatively arranged with reference to the compression piston and working piston, a valve mechanism arranged in the transfer chamber and controlling said chamber ports and the inlet and exhaust ports, and means appurtenant to the transfer chamber for controlling the exhaust from the working cylinder through the said transfer chamber.

2. An internal combustion engine comprising a plurality of working and compression cylinders, a plurality of working pistons, a plurality of compression pistons operatively arranged with reference thereto, a plurality of transfer chambers operatively arranged with reference to said working and compression pistons, valves controlling said transfer chambers and arranged to control the induction and eduction of a charge of mixture with reference to the compression pistons and controlling the induction and exhaust with reference to the working pistons during each complete cycle of movement of the working pistons, an exhaust port in each of the transfer chambers, and a valve controlling said port and permitting a primary exhaust of the main cylinder through the transfer chamber and said port.

3. An internal combustion engine comprising working and compression cylinders, a main working piston, a simultaneously acting compression piston, a transfer chamber operatively arranged with reference to said pistons for receiving directly from the compression piston a compressed charge, valve mechanism in the said chamber arranged to deliver said charge, under control to the working piston, a port appurtenant to the transfer chamber and a valve controlling said port, and arranged to open the port while the aforesaid valve mechanism is in position to establish communication between the working cylinder and the transfer chamber, whereby an initial exhaust of the main cylinder is controlled through the transfer chamber.

4. An internal combustion engine comprising working and compression cylinders, a main working piston, a compression piston, said working and compression cylinders having ports which alternately serve as induction ports and as eduction ports therefor, a transfer chamber operatively connected with the respective cylinders through said ports, an intermittently actuated valve mechanism controlling said ports, and means for actuating the said valve mechanism arranged to cause it to pause with the ports of the working cylinder and the compression cylinder open and serving as induction ports during the working stroke, and to cause it to pause with the port of the compression cylinder open to the transfer chamber and the port of the working cylinder open to the atmosphere.

5. An internal combustion engine comprising working and compression cylinders, a main working piston, a compression piston, a valve-controlled transfer chamber operatively arranged with reference to said pistons for receiving from the compression piston a fully compressed charge under firing pressure and delivering said charge ignited to the working cylinder, and means appurtenant to said transfer chamber for passing an initial exhaust of the working cylinder through said chamber and permitting complete exhaust of said cylinder direct to the atmosphere.

6. An internal combustion engine comprising working and compression cylinders, a main working piston, a compression piston, a transfer chamber intermediate the compression cylinder and the working cylinder and communicating with each, valve mechanism for the transfer chamber arranged to put the latter into communication with the compression chamber to receive therefrom the fuel charge under full compression, and to deliver the charge under control and full compression, and cut off from the compression chamber to the working cylinder as the piston thereof is at or near the end of its exhaust stroke, and means for scavenging the transfer chamber and causing an initial and partial exhaust of the working cylinder through the transfer chamber and the final exhaust direct to the atmosphere.

WALTER H. SHIMPF.

Witnesses:
KATE BRENNER,
WM. B. HILL.